(12) United States Patent
Murai et al.

(10) Patent No.: US 7,593,516 B2
(45) Date of Patent: Sep. 22, 2009

(54) ELECTRONIC APPARATUS

(75) Inventors: Nobuaki Murai, Kasuya-gun (JP);
Takaharu Nakatsuka, Kasuga (JP);
Kouki Hamada, Fukuoka (JP); Saori Masuda, Fukuoka (JP)

(73) Assignee: Panasonic Corporation, Osaka (JP)

( * ) Notice: Subject to any disclaimer, the term of this patent is extended or adjusted under 35 U.S.C. 154(b) by 791 days.

(21) Appl. No.: 11/242,830

(22) Filed: Oct. 5, 2005

(65) Prior Publication Data
US 2006/0082835 A1    Apr. 20, 2006

(30) Foreign Application Priority Data
Oct. 7, 2004    (JP) .................. P. 2004-294807
Feb. 28, 2005    (JP) .................. P. 2005-052833

(51) Int. Cl.
*H04M 11/00*    (2006.01)

(52) U.S. Cl. .................. 379/100.16; 379/88.16; 358/406

(58) Field of Classification Search .............. 379/88.16, 379/100.16
See application file for complete search history.

(56) References Cited

U.S. PATENT DOCUMENTS

| | | | |
|---|---|---|---|
| 5,592,583 A * | 1/1997 | Sakurai ............... | 704/200 |
| 5,838,458 A * | 11/1998 | Tsai ..................... | 358/402 |
| 6,201,903 B1 | 3/2001 | Wolff et al. | |
| 6,410,839 B2 * | 6/2002 | Okubo et al. ........ | 84/637 |
| 6,480,294 B1 | 11/2002 | Toyoda et al. | |
| 6,493,103 B2 | 12/2002 | Toyoda et al. | |

FOREIGN PATENT DOCUMENTS

| | | |
|---|---|---|
| JP | 55-76425 | 6/1980 |
| JP | 63-234357 | 9/1988 |
| JP | 1-228059 | 9/1989 |
| JP | 6-30173 | 2/1994 |
| JP | 9-258669 | 10/1997 |
| JP | 11-122399 | * 4/1999 |
| JP | 11-164074 | 6/1999 |
| JP | 2003-169126 | 6/2003 |
| JP | 2004-165782 | 6/2004 |

OTHER PUBLICATIONS

English Language Abstract of JP 6-30173.
English Language Abstract of JP 55-76425.
English Language Abstract of JP 63-234357.
English Language Abstract of JP 1-228059.
English Language Abstract of JP 9-258669.
English Language Abstract of JP 11-164074.
English Language Abstract of JP 2003-169126.
English Language Abstract of JP 2004-165782.

* cited by examiner

*Primary Examiner*—Simon Sing
(74) *Attorney, Agent, or Firm*—Greenblum & Bernstein, P.L.C.

(57) ABSTRACT

An electronic apparatus includes: a memory for storing voice data of an operation explanation related to a function of the electronic apparatus; a speaker for outputting operation explanatory voice based upon the voice data stored in the memory; a push-button for instructing an execution of the function with respect to the electronic apparatus; and a control unit for turning ON, or flickering the push-button when the operation explanatory voice is being outputted from the speaker.

10 Claims, 11 Drawing Sheets

| CODE | VOICE DATA |
|---|---|
| 1 | PLEASE DEPRESS COPY BUTTON IN CASE THAT COPYING OPERATION IS CARRIED OUT. PLEASE DEPRESS FAX BUTTON IN CASE THAT ORIGINAL IS FAX-TRANSMITTED |
| 2 | PLEASE INSERT ORIGINAL UNTIL BEEP SOUND IS PRODUCED WHILE TURNING DOWNWARDLY ORIGINAL PLANE TO BE FAX-TRANSMITTED |
| ⋮ | ⋮ |

◉ : ILLUMINATION DEVICE SUCH AS LED

ELECTRONIC APPARATUS

BACKGROUND

The present invention is related to such a type of electronic apparatus that a plurality of push-button switches are depressed in operations for performing functions.

Recently, in particular, electronic apparatus such as business-purpose electronic appliances and domestic electronic appliances are equipped with large numbers of functions, while large numbers of push-button switches used to perform these functions are provided on these electronic apparatus. Among these electronic apparatus, such electronic apparatus equipped with voice guidance functions have been currently popularized in order to improve operabilities by users. For example, such electronic apparatus has been proposed in Japanese Patent Publication No. Hei-6-30173.

However, these electronic apparatus own the below-mentioned problems. That is, in such a case that a plurality of push-buttons are required to be depressed every function, users can hardly grasp names of push-buttons and arranging positions of these push-buttons, and users can hardly judge that which push-buttons should be sequentially depressed. As a result, lengthy time is necessarily required for performing one function.

SUMMARY

As a consequence, the present invention has an object to provide an electronic appliance having a high operability with employment of firm operation guidance.

To solve the above-described problem an electronic apparatus, according to invention, includes: a memory for storing voice data of an operation explanation related to a function of the electronic apparatus; a speaker for outputting operation explanatory voice based upon the voice data stored in the memory; a push-button for instructing an execution of the function with respect to the electronic apparatus; and a control unit for turning ON, or flickering the push-button when the operation explanatory voice is being outputted from the speaker.

Preferably, in the electronic apparatus, the function includes at least a facsimile transmission function and a copy function.

A facsimile apparatus, according to invention, includes: a memory for storing voice data of operation explanations of respective functions of the facsimile apparatus; an operation explanation outputting unit for reading out the voice data from the memory so as to output the operation explanation by way of voice; a plurality of push-buttons for instructing the facsimile apparatus to execute the respective sorts of functions; and a control unit operated in such a manner that when the operation explanation by the voice is being outputted from the facsimile apparatus, the control unit turns ON, or flickers a button among the plurality of buttons, which is related to the operation explanation by the voice being outputted by the operation explanation outputting unit.

Preferably, in the facsimile apparatus, the facsimile apparatus is further comprised of: a reading unit for reading an original; a facsimile transmitting unit for FAX-transmitting the original read by the reading unit; a printer for printing the original read by the reading unit; and a facsimile control unit for controlling the reading unit, the facsimile transmitting unit, and the printer, the plurality of push-buttons include: at least a facsimile button for instructing the facsimile apparatus to execute a FAX-transmission of the original; a dial button for entering a telephone number of a FAX communication counter party to the facsimile apparatus; and a copy button for instructing the facsimile apparatus to execute a copying operation of the original; the facsimile control unit controls the reading unit to read the original in response to the input of the facsimile button, controls the facsimile transmitting unit to FAX-transmit the original read by the reading unit, controls the reading unit to read the original in response to the input of the copy button, and controls the printer to print the original read by the reading unit.

Preferably, in the facsimile apparatus, the memory stores voice data of a first operation explanation for prompting a user of the facsimile apparatus to instruct an execution of any one of a facsimile transmission function and a copy function, voice data of a second operation explanation related to the facsimile transmission function, and voice data of a third operation explanation related to the copy function.

Preferably, in the facsimile apparatus, the control unit controls the operation explanation outputting unit so as to output the first operation explanation, and to turn ON both the facsimile button and the copy button.

Preferably, in the facsimile apparatus, when the facsimile button is operated while the first operation explanation is outputted, the control unit interrupts outputting of the first operation explanation, and turning ON of both the facsimile button and the copy button, and thereafter, the control unit controls the operation explanation outputting unit so as to output the second operation explanation.

Preferably, in the facsimile apparatus, when the copy button is operated while the first operation explanation is outputted, the control unit interrupts outputting of the first operation explanation, and turning ON of both the facsimile button and the copy button, and thereafter, the control unit controls the operation explanation outputting unit so as to output the third operation explanation.

With employment of the above-described arrangement, in accordance with the electronic apparatus of the present invention, a user may receive operation guidance by way of both voices and visualization, so that the user can firmly perform desirable operation.

In accordance with the present invention, since the user receives the operation guidance by way of both the voices and the visualization, the operability of the electronic apparatus can be improved, and also, the operation time thereof can be shortened.

EMBODIMENT

An embodiment as to the electronic apparatus according to the present invention will now be described in detail with reference to drawings, while facsimile apparatus are exemplified.

Embodiment 1

Figure 1:
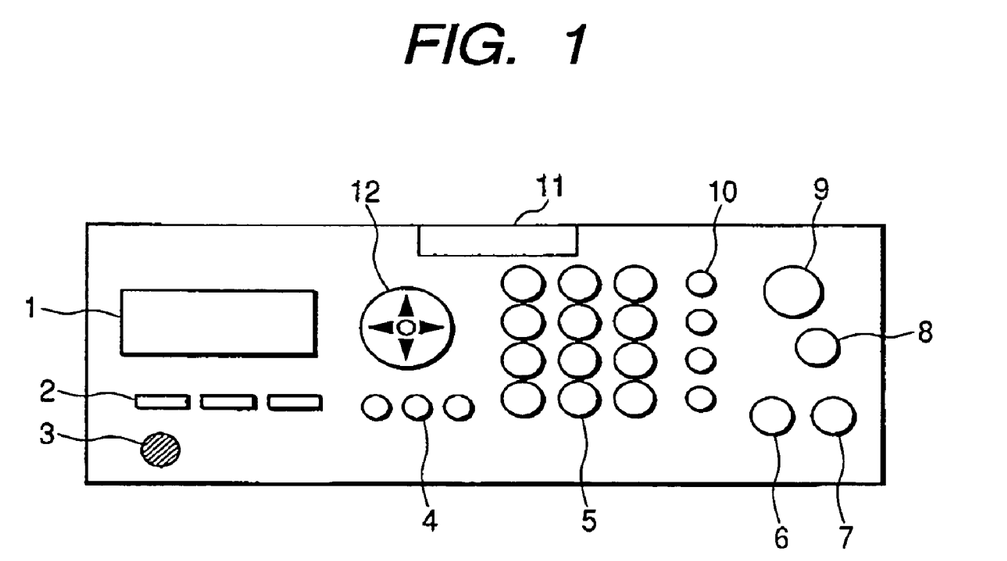
FIG. 1 is a conceptional diagram for indicating an operation unit of a facsimile apparatus as an embodiment 1 of an electronic apparatus according to the present invention.

FIG. 1 is an outer view of an operation panel unit of a facsimile apparatus which is employed so as to explain the embodiment of the present invention. In FIG. 1, reference numeral 1 indicates a display unit which displays thereon various sorts of information containing an operating condition (for example, "under transmission of facsimile apparatus"), a telephone number of a communication counter party, and operation guidance. Reference numeral 2 indicates a button (one-touch button) used to automatically dial a previously registered telephone number. Reference numeral 3 shows a voice guidance button used to start voice guidance. Reference numeral 4 represents a button (function registering button) used to start function registering operation, for example, time setting operation, and a user name registering operation. Reference numeral 5 shows a dial button used to enter a numeral. Reference numeral 6 indicates a copy button used to actuate a copy function. Reference numeral 7 is a facsimile button used for a facsimile transmission. Reference numeral 8 shows an operation stopping button (stop button). Reference numeral 9 indicates a telephone answer setting button used to actuate a telephone answer setting function. Reference numeral 10 represents a calling button used to hold a telephone communication and to call a cordless child telephone unit. Reference numeral 11 shows a guide LED (light emitting diode) which indicates an insertion hole of an original when a facsimile transmission is performed and the original is copied. Reference numeral 12 indicates a detail selecting button used when a sound volume is set and a function is registered. It should be noted that when the power supply of this facsimile apparatus is turned ON, or the voice guidance button 3 is depressed by the user, the voice guidance is commenced.

Figure 2A:
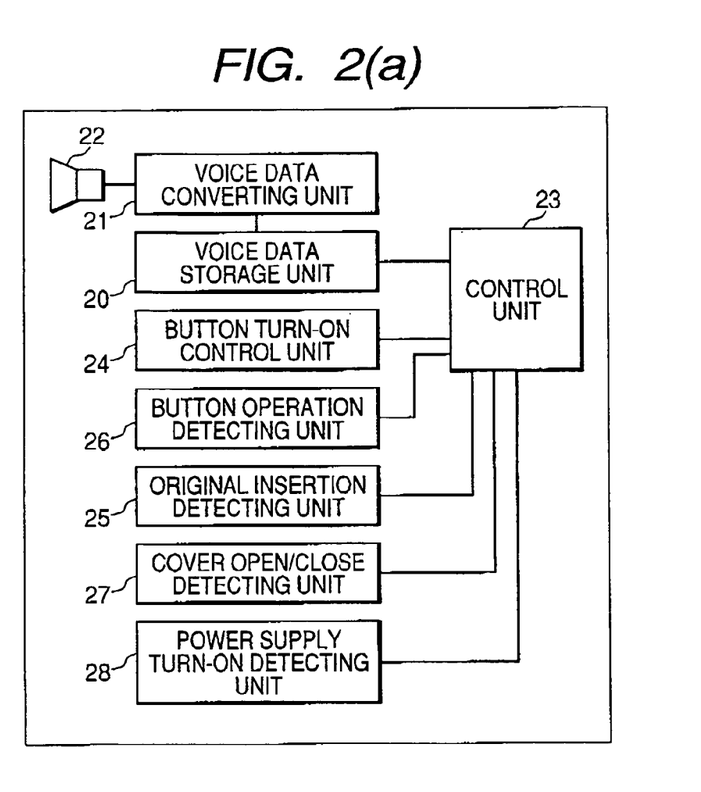
FIG. 2(a) is a block diagram for showing a functional arrangement of the facsimile apparatus.

FIG. 2(a) is a functional block diagram of the facsimile apparatus according to this embodiment 1.

Figure 2B:
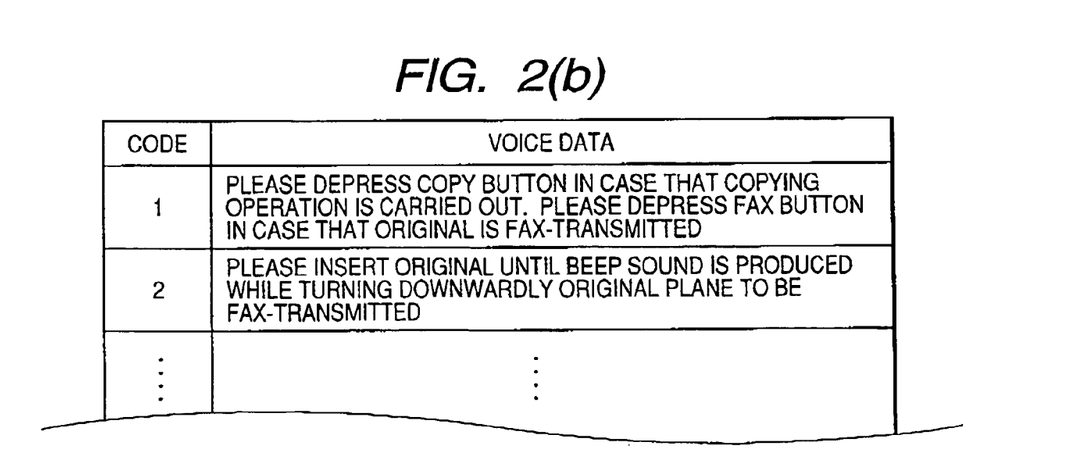
FIG. 2(b) is an explanatory diagram for explaining voice data stored in a voice data storage unit of the facsimile apparatus.

In FIG. 2(a), a voice data storage unit 20 is constituted by employing a semiconductor memory, for example, a 16-Mbits dual operation flash memory (MBM29DL164BE70TN-KE1) manufactured by Fujitsu Co. Ltd, and the like. The voice data storage unit 20 stores thereinto a plurality of voice guidance which is used to instruct and explain operation sequences for performing various functions of the facsimile apparatus. The data as to the respective voice guidance has been coded by, for example, the CELP (Code-Excited Linear Prediction) format, and the coded data have been combined with identification numbers (IDs) for identifying the respective voice guidance, as represented in FIG. 2(b), and then, the combined data have been stored in the voice data storage unit 20. This voice guidance guides and instructs a series of button operations for performing a predetermined function in accordance with operation sequences by way of voice, and thus, may instruct buttons which should be depressed in accordance with this guidance. Furthermore, respective voice information contained in this voice guidance has been stored in the voice data storage unit 20 in connection with the buttons which should be depressed. When a specific button operation is carried out by the user, a button operation which should be subsequently performed is explained in the voice manner.

A voice data converting unit 21 converts voice guidance data (voice information) read out from the voice data storage unit 20 into voice data which can be outputted, and then, outputs the converted voice data from a voice output unit (speaker) 22 as voice. When the voice guidance button 3 is operated by the user, a button operation detecting unit 26 detects the depression of this voice guidance button 3, and then, a control unit (CPU) 23 to which this depression detection is notified performs a control operation in such a manner that voice guidance is commenced.

In this control operation, the control unit 23 performs the respective control operations of this facsimile apparatus is accordance with a control program which has been stored in a semiconductor memory, for example, a 16-Mbits dual operation flash memory (MBM29DL164BE70TN-KE1) manufactured by Fujitsu Co. Ltd., and the like. This control unit 23 is arranged by a microprocessor, for instance, an ASIC (Application Specific Integrated Circuit) by a Z80 compatible CPU.

Also, the voice data converting unit 21 is constituted by, for example, a FAX-modem purpose IC (model number: FM209VSILF) supplied from CONNECSANT SYSTEMS Inc. In response to an instruction issued from the control unit 23, this voice data converting unit 21 reads CELP-formatted voice guidance data stored in the voice data storage unit 20, and converts this read voice guidance data into voice data so as to output voice guidance from the speaker 22.

In other words, the control unit 23 instructs the voice data converting unit 21 to output voice guidance corresponding to each of steps in accordance with an operation (will be explained later) of the facsimile apparatus. In response to an instruction issued from the control unit 23, the voice data converting unit 21 reads out data of voice guidance corresponding to the designated step from the voice data storage unit 21, and converts the read voice guidance data into voice data so as to output the voice guidance from the speaker 22.

Also, as explained above, when the voice guidance button 3 is manipulated by the user, this control unit 23 causes a button turn-ON control unit 24 to sequentially flicker, or turn ON the respective operation buttons which are related to the respective voice information in synchronism with the commencement of starting of this voice guidance.

Figure 3:
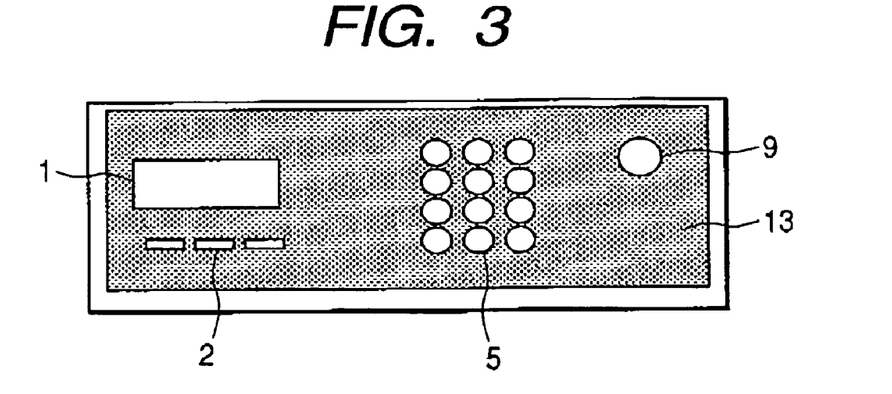
FIG. 3 is a conceptional diagram for showing an operation unit in the case that a cover of the facsimile apparatus is closed.
Figure 4A:
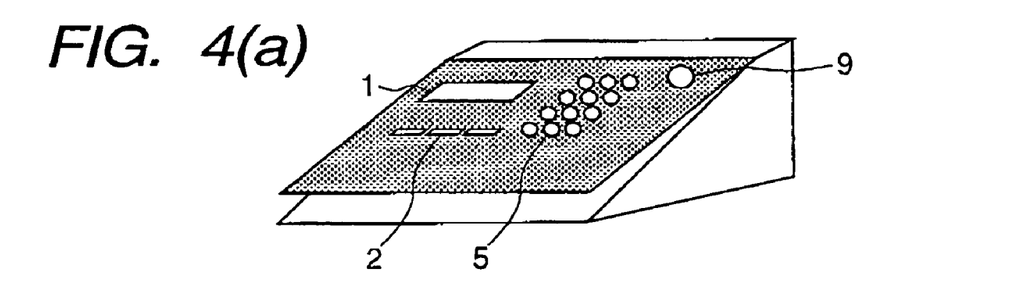
FIG. 4(a) is a perspective view for showing an operation unit in the case that the cover of the facsimile apparatus is closed.
Figure 4B:
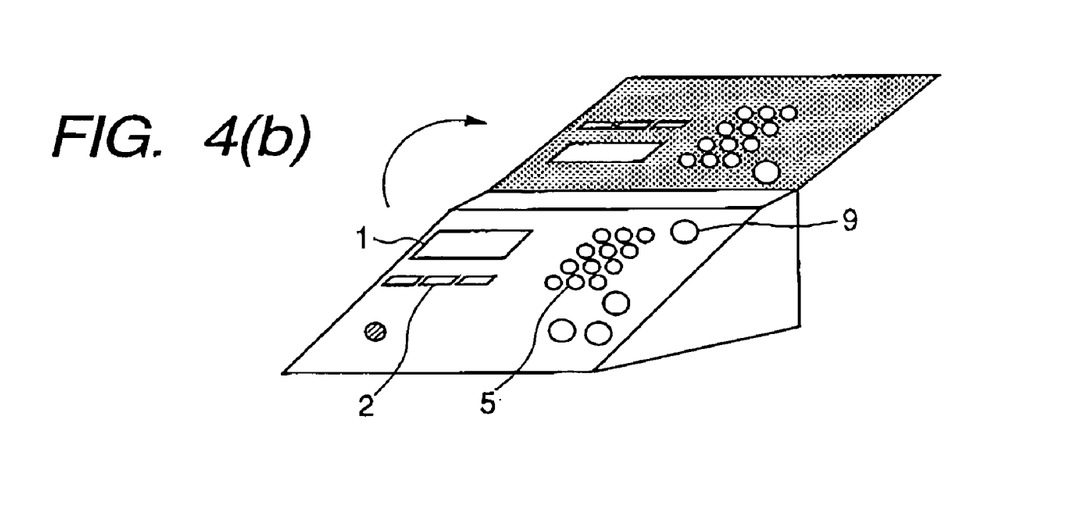
FIG. 4(b) is a perspective view for showing an operation unit in the case that the cover of the facsimile apparatus is opened.

In addition to the voice guidance button 3, the voice guidance is further commenced by such an operation that a cover unit 13 is opened. That is to say, when the user opens the cover unit 13 for covering the operation panel unit, so that the entire operation panel unit is brought into a panel exposed condition, a detection signal of a cover open/close detecting unit 27 which has detected this panel exposed condition is notified to the control unit 23. In response to this notified detection signal, the control unit 23 commences voice guidance (refer to FIG. 3 and FIG. 4). When the control unit 23 starts the voice guidance, this control unit 23 performs such a control operation that predetermined voice guidance is automatically operable, namely, such voice guidance for executing the functions related to the plural buttons covered by the cover unit 13 is automatically operable.

It should also be noted that when this cover open/close detecting unit 27 detects such a fact that the cover unit 13 is closed, only voice guidance related to the respective buttons which are not covered by the cover unit 13 is outputted. In this embodiment 1, only voice guidance related to the telephone communication function by the telephone is outputted in this embodiment 1.

Also, an original insertion detecting unit 25 detects that an original has been inserted and set to a predetermined position of an original inserting unit (will be explained later) on the facsimile apparatus by the user.

Furthermore, a power supply turn-ON detecting unit 28 detects that the power supply is turned ON, and then, when the power supply turn-ON detecting unit 28 notifies this turn-ON detection to the control unit 23, the control unit 23 outputs predetermined voice guidance. The voice data converting unit 21, the button turn-ON control unit 24, and the button operation detecting unit 26 are arranged by employing a gatearry IC manufactured by LOGIC RESEARCH Inc, and control the respective own operations in accordance with control programs which have been stored in ROMs built in the respective units 21, 24, 26.

As to basic functions and the basic structures such as voice telephone communications, data transmitting/receiving operations, and other operations, the functions and the structures disclosed in U.S. Pat. No. 6,804,023 may be employed.

Next, operations of the facsimile apparatus according to this embodiment 1 of the present invention will now be described with reference to flow charts shown in FIG. 5 and FIG. 6.

Figure 5:
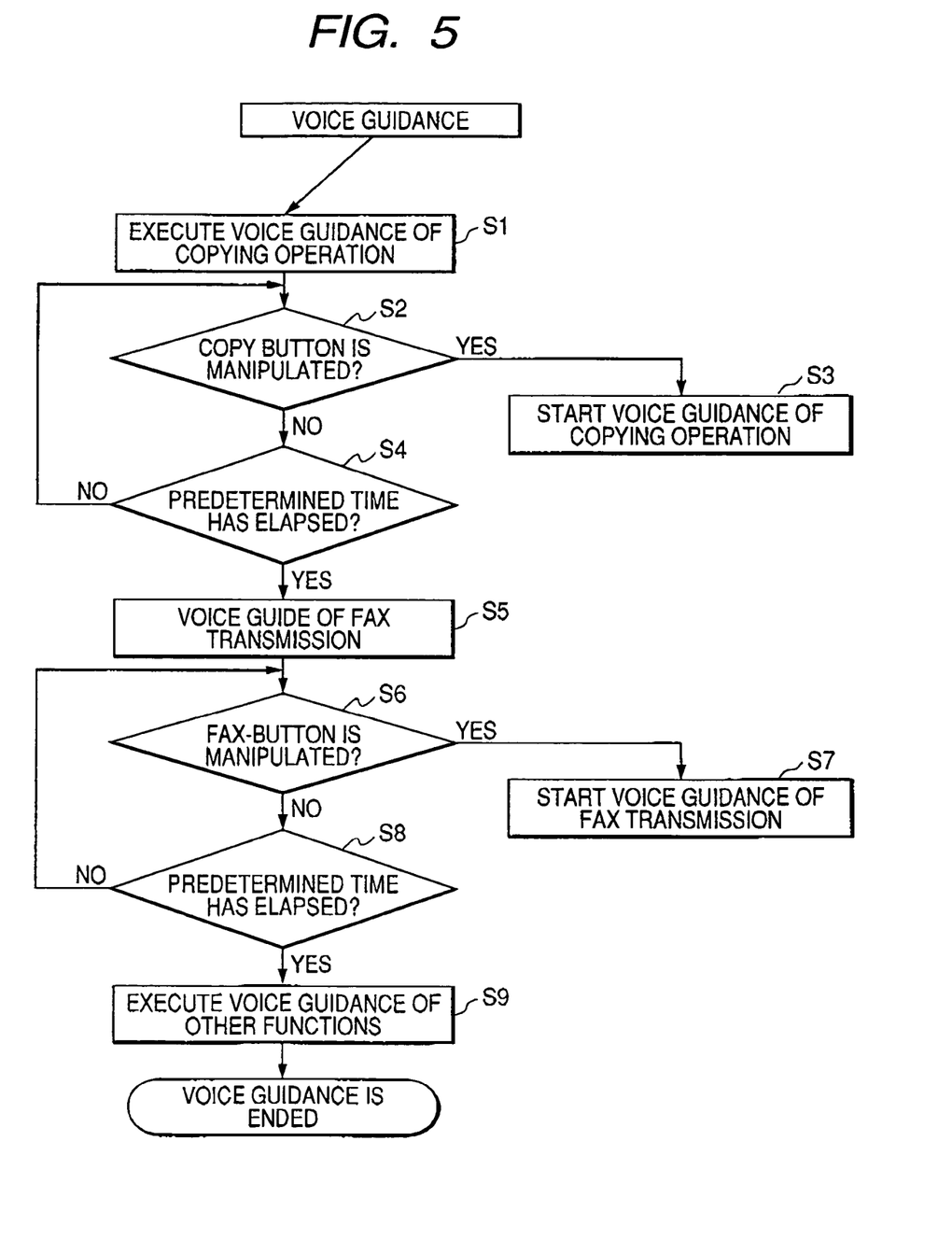
FIG. 5 is a flow chart for describing major flow operations executed in the facsimile apparatus.

In FIG. 5, when the user turns ON the power supply of the facsimile apparatus and then this turn-ON operation is detected by the power supply turn-ON detecting unit 28, or when the button operation detecting unit 26 detects such a fact that the voice guidance button 3 is depressed under such a status that the voice guidance is once accomplished after the power supply has been turned ON, the below-mentioned operations represented in the flow chart of FIG. 5 are commenced.

First, in a step S1, as the voice guidance, such a voice message "when copy is made, please depress copy button" is outputted from the output unit 22. At the same time, the control unit 23 controls the button turn-ON control unit 24 in such a manner that the copy button 6 corresponding to the button related to the copying operation is turned ON, or flickered.

In a step S2, the button operation detecting unit 26 detects as to whether or not the copy operation button is manipulated. When the copy operation button is manipulated, the control unit 23 commences a voice guide (guidance) related to the copying operation (step S3). Also, this copy operation button is not manipulated, but after a predetermined time has elapsed (step S4), the control operation is advanced to such a next voice guidance other than the voice guidance for copying operation and voice guidance for facsimile transmission.

In a step S5, as the voice guidance, such a voice message "when facsimile transmission is carried out, please depress FAX button" is outputted from the output unit 22. The control unit 23 controls the button turn-ON control unit 24 in such a manner that the FAX button 7 is turned ON, or flickered, which is related to the facsimile transmission.

In a step S6, when the FAX button 7 is manipulated, such a voice guidance used for the facsimile communication function is operated (step S7).

Also, this FAX button 7 is not manipulated, but after a predetermined time has passed (step S5), the control operation is advanced to such a voice guidance for actuating the next function (step S9). For instance, the one-touch button 2, the function registering button 4, the telephone answer setting button 9, and such operation buttons are turned ON, or flickered. These operation buttons are required to sequentially output voice guidance of the respective functions, and at the same time, to operate the respective functions.

Furthermore, while a certain button is turned ON, if the user depresses this turned-ON button, then this button depression is detected by the button operation detecting unit 24. The control unit 23 ceases the voice guidance under output, and switches this stopped voice guidance to next voice guidance.

In connection with turning-ON operations of the respective buttons, if an explanation made by characters is also displayed on the display unit such as the LCD 1, then it can be easily supposed that recognition of the user can be improved.

Figure 6:
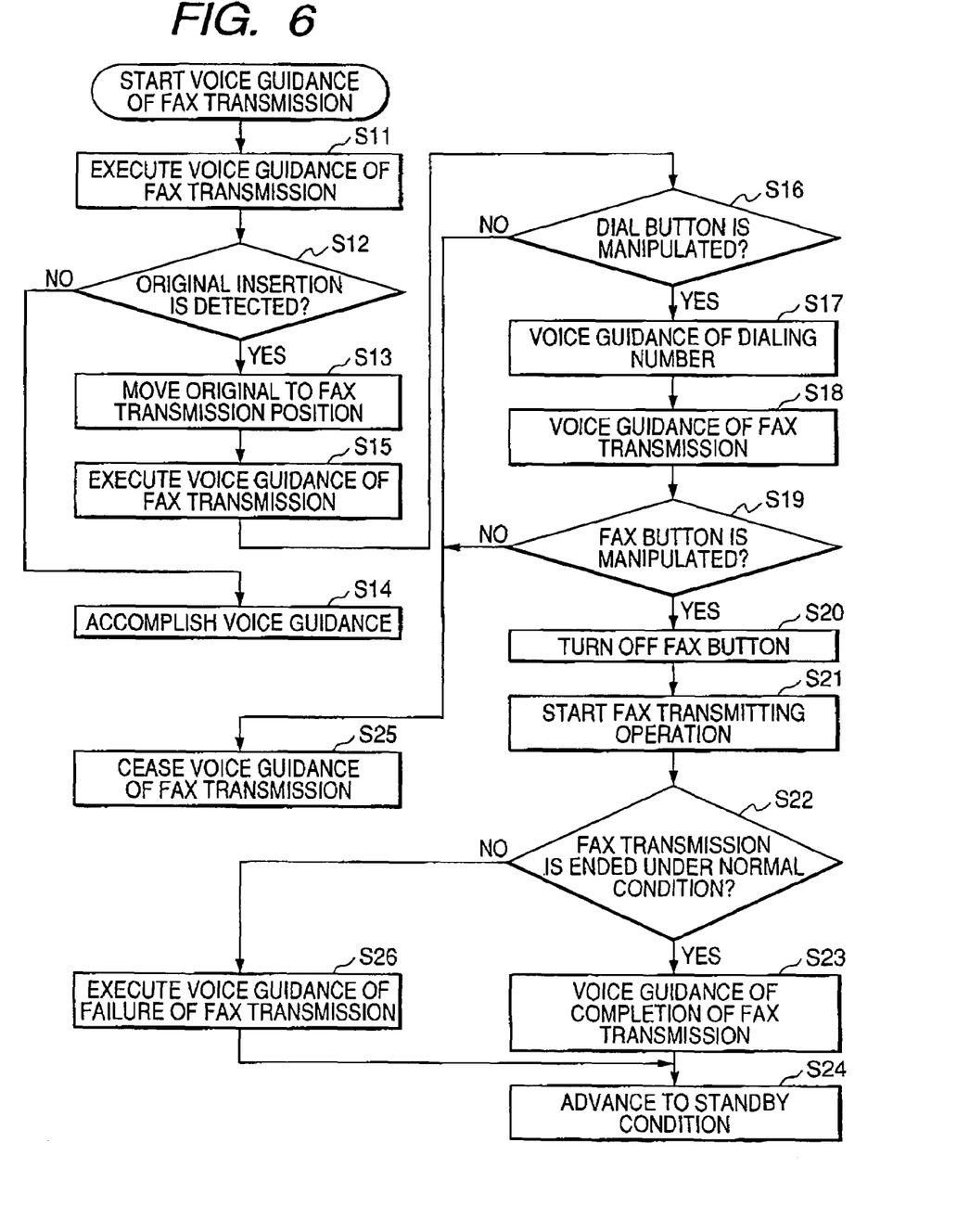
FIG. 6 is a flow chart for describing flow operations of a facsimile transmitting operation executed in the facsimile apparatus.

Next, a description is made of operations of this facsimile apparatus when the facsimile communication voice guidance is commenced in the step S7 of FIG. 5 with reference to the flow chart of FIG. 6.

In FIG. 6, in a step S11, such a voice guidance message for the facsimile communication function "when facsimile transmission is carried out, please insert original until "peep" sound is produced while original plane to be FAX-transmitted is turned downwardly" is started to be outputted, and the original insertion hole guide button (LED) 11 is turned ON, or flickered. In a step S12, in such a case that the original insertion detecting unit 25 detects such a fact that the user sets the original to a preselected position of the facsimile apparatus within a predetermined time after turning ON, or flickering of this guide button 11 has been commenced, if this detection result is transmitted to the control unit (CPU) 23, then this control unit 23 automatically pulls the original to the normal position (step S13).

Also, in the case that the above-explained original detecting operation is not carried out within the predetermined time in the step S12, the voice guidance for this facsimile transmission is ended (step S14).

In a step S15, as the voice guidance, such a voce message "please enter telephone number of communication counter party, and finally, depress FAX button" is outputted, and at the same time, the dial button 5 is turned ON, or flickered.

In a step S16, the button operation detecting unit 26 detects as to whether or not the dial button is manipulated by the user within a predetermined time after the above-described dial button has been turned ON. If the detection of this dial button manipulation is made, then the dial button is turned OFF and a numeral value of the manipulated dial button is outputted as a voice message. It should be understood that since this function is well known in this technical field, explanations thereof is omitted.

Also, if the detection of this dial button manipulation is not made, then the control unit 23 ceases the facsimile transmission guidance as an error operation (step S25).

When the reading operation of the depressed dial button is ended in a step S17, such a voice guidance message "original is FAX-transmitted" is outputted from the speaker 22, and the facsimile button 7 is turned ON, or flickered, and then, the voice guidance operation is advanced to a mode for a facsimile transmission.

In a step S19, in such a case that the facsimile button 7 is manipulated by the user within a predetermined time after the facsimile button 7 has been turned ON, or flickered, this facsimile button 7 is turned OFF (step S20), and the facsimile transmitting operation is commenced (step S21). Also, when the above-explained facsimile button 7 is not manipulated in the above step S19, the voice guidance operation is advanced to a step S25.

In the step 21, the facsimile apparatus automatically dials the entered telephone number, and then, transmits FAX data to a facsimile apparatus of a communication counter party in accordance with a predetermined transmission manual. The operation of the own facsimile apparatus is advanced to the below-mentioned statuses in accordance with such a condition as to whether or not the facsimile transmission can be carried out.

In a step S22, in the case that the facsimile transmission is accomplished under normal condition, such a voice guidance message "original has been FAX-transmitted" is outputted (step S23).

On the other hand, in the step S22, in such a case that the facsimile transmission is brought into an error status due to some reason, such a voice guidance message "original could not be FAX-transmitted" is outputted, and the facsimile button 7 is turned ON for a predetermined time, and thereafter, is turned OFF (step S26).

While this facsimile apparatus owns the telephone function, although users own sufficiently deep knowledge as to the operations for using the normal telephone function, these users have little knowledge as to such operations which are not frequently used, for example, copying operation, facsimile transmitting operation, and the like. Under such a circumstance, in this facsimile apparatus, in the case that the cover open/close detecting unit 27 detects such a fact that the cover unit 13 for covering the copy button 6 and the facsimile button 7 is opened (otherwise, in case that voice guidance button 3 is depressed), the detecting unit 17 transmits this detection result to the control unit 23. Thus, this control unit 23 commences the voice guidance for the copy function and the voice guidance for the facsimile transmission function (from FIG. 4(a) up to FIG. 4(b)). The contents and the sequential operations as to the voice guidance are identical to those shown in FIG. 5 and FIG. 6.

These is no specific difference between an effect achieved by that voice of the above-explained voice guidance has been previously recorded, and another effect achieved by that voice of the above-explained voice guidance is electronically synthesized. These two voice producing methods may be realized by partially changing the structural contents of the facsimile apparatus.

It should also be noted that the above-explained turning ON and flickering operations of the button may be realized even if the button itself is not turned ON and is not flickered. That is, a similar effect to the effect achieved by turning ON and flickering an operation button itself may be executed by arranging this operation button and an illumination device such as an LED at a position where the user can readily grasp that this illumination device is interconnected to the operation button.

Figure 7:
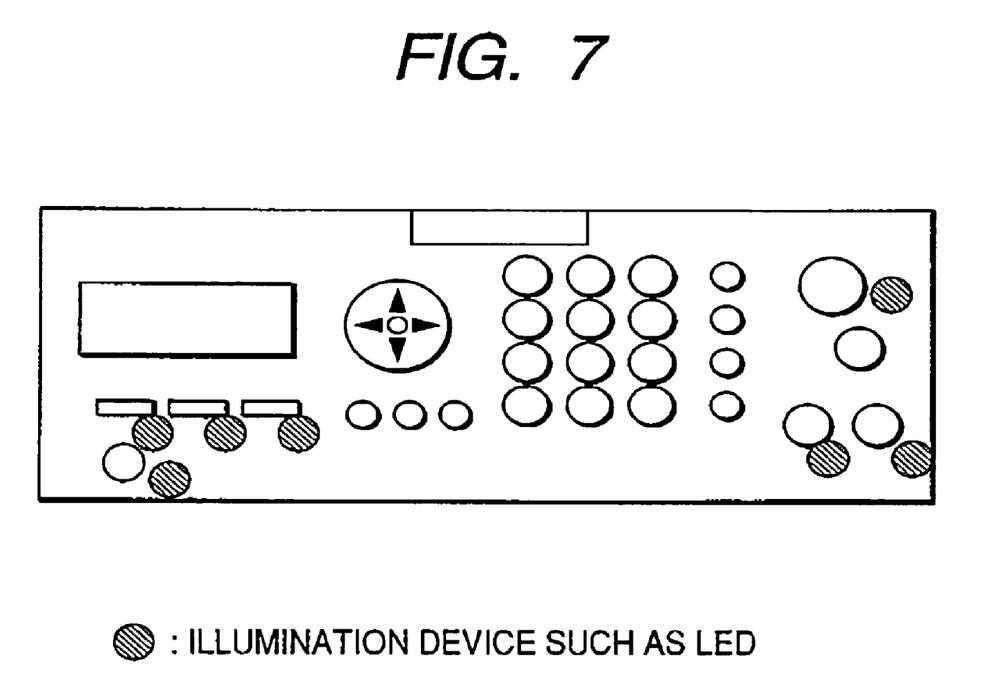
FIG. 7 is a conceptional diagram for showing such a case that an illuminating device such as an LED is arranged at a position interlinked to an operation button in the facsimile apparatus.

This alternative idea is illustrated in FIG. 7. FIG. 7 briefly shows an operation unit in the case that illumination devices such as LEDs are arranged in interconnection with operation buttons, while these operation buttons themselves are not turned ON/flickered.

Since this alternative structural idea is employed, the operation buttons themselves are no longer turned ON and flickered, and also, the operation buttons themselves are no longer made semi-transparent for turn-ON and flicking operations, so that low cost of the facsimile apparatus may be expected.

Also, the above-described explanation has been made under such condition that the operation buttons and the voice guidance sending unit are present at the same time in the facsimile apparatus. However, although a video recorder and a television receiver are operated by using remote controllers, there are some cases that actual functions are operated by various sorts of apparatus located at a remote place.

Since data is mutually communicated between a remote controller and a video recorder, or a television receiver in a wireless/wired manner, a content set by this remote controller is realized as a function of the video recorder, or the television receiver. Also, in such a case, since an operation button of the remote controller is turned ON/flickered, and voice guidance related to a setting operation is produced from the video recorder, or the television receiver in synchronism with the turning-ON/flickering operation of this operation button, such an effect may be achieved which is similar to the effect obtained in the case that the operation button and the noise guidance sending unit are provided at the same time.

As previously explained, in this embodiment 1, the buttons of the operation unit are turned ON/flickered by the illuminating devices such as LEDs in interconnection with productions of the voice guidance in order that the user is guided to realize the target function. As a result, the user can readily realize the target function even when the user need not read carefully an operation manual, or the like. Moreover, it is possible to avoid an erroneous setting operation by erroneous operation, so that the user can use the various sorts of electronic apparatus in a comfortable manner.

Embodiment 2

Figure 8A:
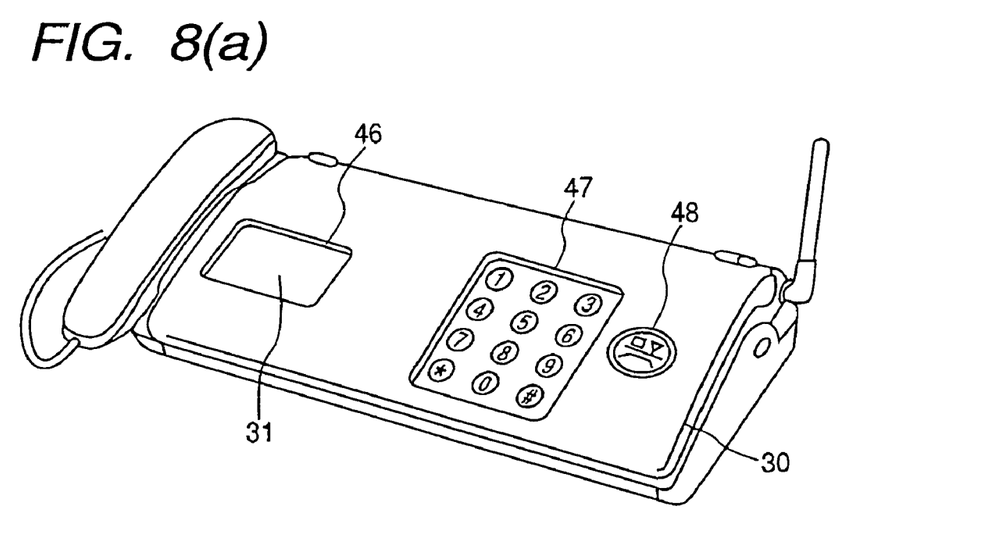
FIG. 8(a) is a perspective view for indicating an operation unit in the case that a cover of a facsimile apparatus is closed as an embodiment 2 of an electronic apparatus according to the present invention.
Figure 8B:
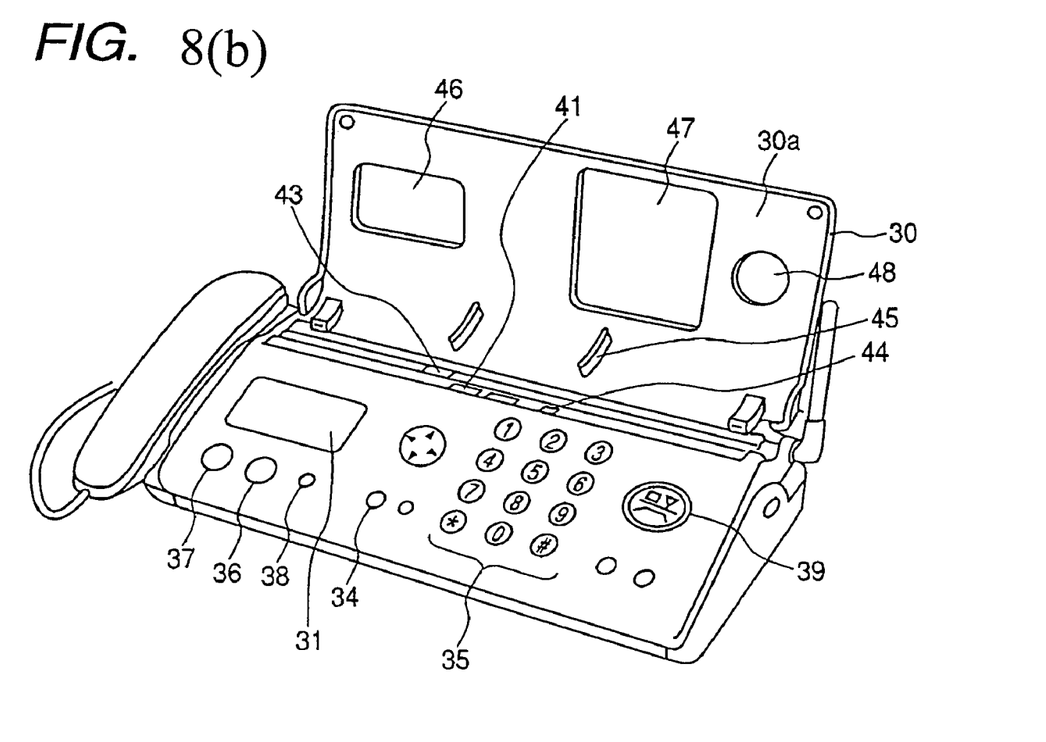
FIG. 8(b) is a perspective view for indicating an operation unit in the case that the cover of a facsimile apparatus is opened.

FIG. 8 is an outer view for showing a facsimile apparatus according to another embodiment 2 of the present invention. In this FIG. 8, FIG. 8(a) shows a condition that a cover unit 30 is closed, and FIG. 8(b) indicates such a condition that the cover unit 30 is opened so as to expose an entire portion of an operation panel unit. A display unit 31 is constituted by such a liquid crystal display device having a pixel number of 2496, and a size of 62.37 mm×21.29 mm. This display unit 31 displays thereon various sorts of information containing an operating condition (for example, "under transmission of facsimile apparatus"), a telephone number of a communication counter party, and operation guidance. The display unit 31 corresponds to a display unit for displaying the operation conditions of the facsimile apparatus. Reference numeral 34 represents a button (function registering button) used to start function registering operation, for example, time setting operation, and a user name registering operation. Reference numeral 35 shows a dial button used to enter a numeral. Reference numeral 36 indicates a copy button used to actuate a copy function. Reference numeral 37 is a facsimile button used for a facsimile transmission. Reference numeral 38 shows an operation stopping button (stop button). Reference numeral 39 indicates a telephone answer setting button used to actuate a telephone answering function.

While these buttons contain LEDs (light emitting diodes) respectively, these LEDs may be turned ON under control of the control unit 23. It should also be noted that concrete structures of these buttons of the display devices such as LEDs are disclosed in U.S. Pat. No. 6,670,565.

Reference numeral 41 shows a guide LED which is provided in the vicinity of an original inserting hole so as to indicate a position of the original inserting hole with respect to the user when a facsimile transmission operation and a copying operation are carried out. Reference numeral 42 shows a detail selecting button used when a sound volume is set, a function is registered, and also, when a telephone directory is read and is additionally described. Reference numeral 43 represents an original inserting hole used to insert an original.

Reference numeral 44 shows a switch button used to detect that the cover unit 30 is opened/closed. Reference numeral 45 indicates a rib which is upwardly provided at a position located opposite to the switch button 44 of a rear plane 30a of the cover unit 30. When the cover unit 30 is completely closed, the rib 45 pushes the switch button 44, and thus, a sensing signal for indicating the closing condition of the cover unit 30 is notified via the cover open/close detecting unit 27 to the control unit 23. Also, when the cover unit 30 is opened, the rib 45 is separated from the switch button 44, and thus, a sensing signal for indicating the opening condition of the cover unit 30 is notified via the cover open/close detecting unit 27 to the control unit 23.

Reference numeral 46 shows a display unit window provided in the cover unit 30 in order to expose the display unit 31 when the cover unit 30 is closed.

Reference numeral 47 shows a dial button window provided in the cover unit 30 in order to expose the dial button 35 when the cover unit 30 is closed. Also, reference numeral 48 shows a telephone answering window provided in the cover unit 30 in order to expose the telephone answer setting button 39 when the cover unit 30 is closed. As indicated in FIG. 8(a), under such a condition that the cover unit 30 is closed, only the display unit 31, the dial button 35, and the telephone answer setting button 39 are exposed by way of these windows, while other buttons are brought into hidden conditions by the cover unit 30. Also, as indicated in FIG. 8(b), since the cover unit 30 is opened, all of the buttons and the like are exposed.

It should be understood that since a hardware structure of the facsimile apparatus according to the embodiment 2 is similar to the hardware structure of the functional block diagram shown in FIG. 2, detailed descriptions thereof are omitted.

Next, a description is made of operations of the facsimile apparatus according to this embodiment 2 of the present invention with reference to drawings. When the user opens the cover unit 30 for covering the operation panel unit, so that the cover closed condition of FIG. 8(a) is changed to the cover opened condition of FIG. 8(b), the rib 45 is separated from the switch button 44, and thus, such a sensing signal for indicating the cover opening condition is notified to the control unit 23. In a flow chart of FIG. 10, when the sensing signal for indicating the cover opening condition is notified to the control unit 23, this control unit 23 initiates a timer (not shown) in response to this sensing signal (step S101), and automatically actuates the function of the voice guidance after the counted time of this timer elapses a predetermined time (for example, approximately 2 seconds) in a step S102. In other words, the control unit 23 reads out such a voice data as the first voice guidance, which corresponds to a message for prompting the user to manipulate any one of the copy button 36 and the facsimile button 37, and then, outputs the read voice data to the voice data converting unit 21. The voice data converting unit 21 outputs voice from the speaker unit 22 based upon the received voice data.

Figure 10:
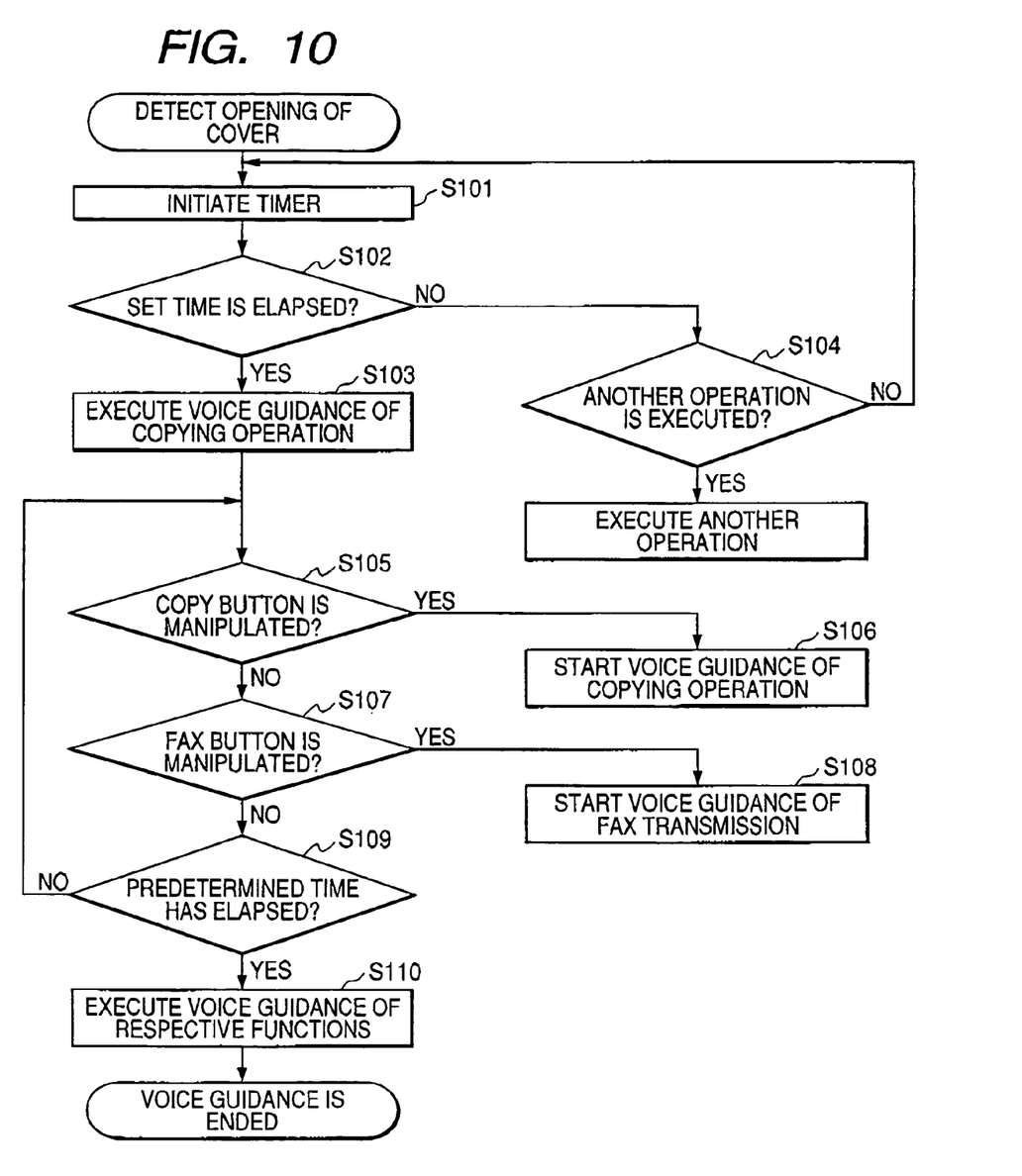
FIG. 10 is a flow chart for describing major flow operations executed in the facsimile apparatus.

In a step S103, as a result, as the voice guidance, such a voice guidance message is outputted from the output unit 22, namely, "please depress copy button in case that copying operation is performed. Please depress facsimile button in case that facsimile transmitting operation is carried out" (step S103). At the same time, the control unit 23 controls the button turn-ON control unit 24 in such a manner that both the LED contained in the copy button 36 and the LED contained in the facsimile button 37 are flickered.

When another manipulation is performed by the user before the user has opened the cover unit 30 and the counted time of the timer has elapsed the above-described predetermined time (for example, approximately 2 seconds) in a step S104, the control unit 23 judges that this operation is such an operation other than the copying operation and the facsimile transmitting operation, and commences this operation in accordance with a manipulation without actuating the voice guidance. Also, when a preselected time duration has passed while no manipulation is made by the user, the control unit 23 produces such a voice guidance message that the operation of this facsimile apparatus is accomplished.

If a detection is made that the copy button 36 is manipulated by the user in a step S105, then the control unit 23 starts voice guidance for guiding the copying operation (step S106). If a detection is made that the facsimile button 37 is manipulated by the user in a step S107, then the control unit 23 starts voice guidance for guiding the facsimile transmitting operation (step S108).

Also, if such a detection is made that the copy button 36 is manipulated (step S105), then the control unit 23 continuously turns ON only the copy button 36 corresponding to the button related to the copying operation, and turns OFF the other button, namely the facsimile button 37.

Also, if such a detection is made that the facsimile button 37 is manipulated (step S107), then the control unit 23 continuously turns ON only the facsimile button 37 corresponding to the button related to the facsimile transmitting operation, and turns OFF the other button, namely the copy button 36.

It should also be noted that in such a case that both the copy button 36 and the facsimile button 37 start to be flickered in the step S103, and thereafter, none of other buttons is manipulated for a predetermined time duration (step S109), the control unit 23 repeatedly and again produces such voice guidance messages of the respective functions "please depress copy button in case that copying operation is carried out, . . . , please depress facsimile button in case that facsimile transmitting operation is carried out" (step S110).

Figure 9:
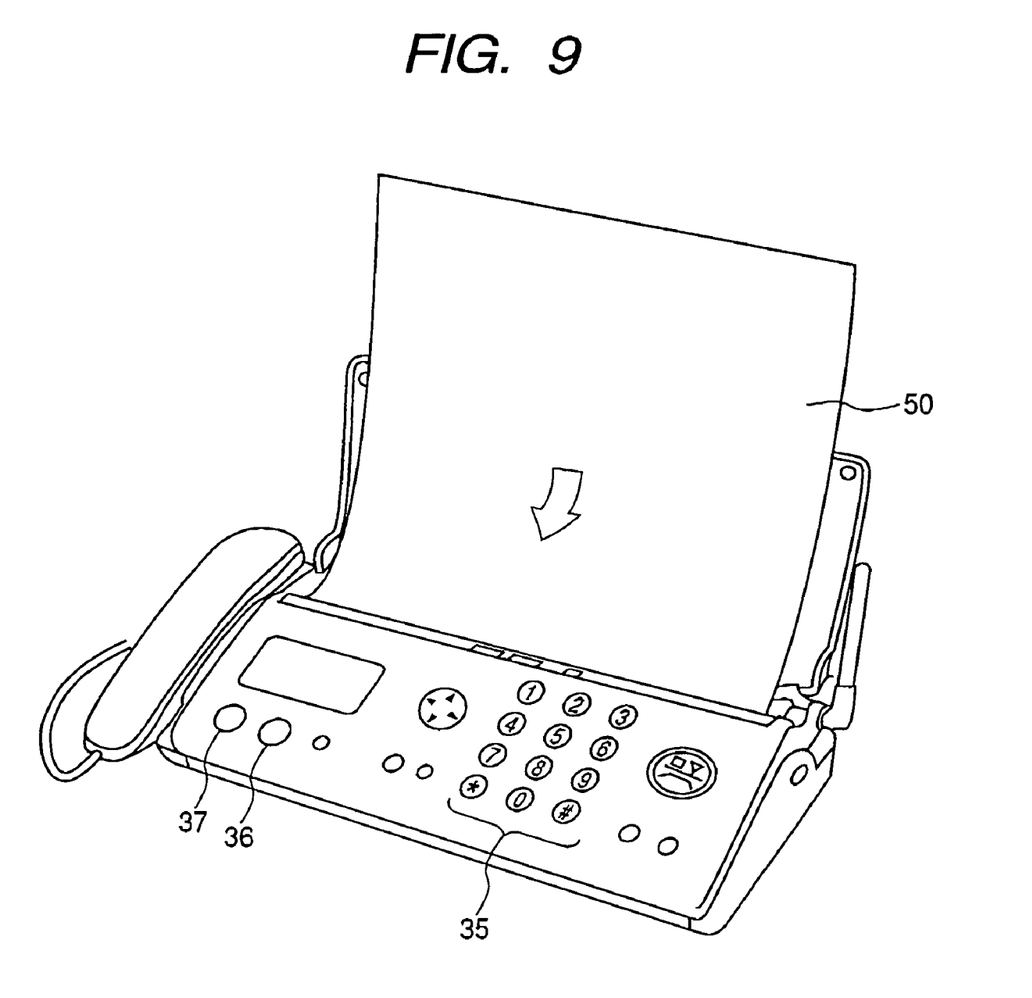
FIG. 9 is a perspective view for showing such a condition that the cover of the facsimile apparatus is opened so as to insert an original.
Figure 11:
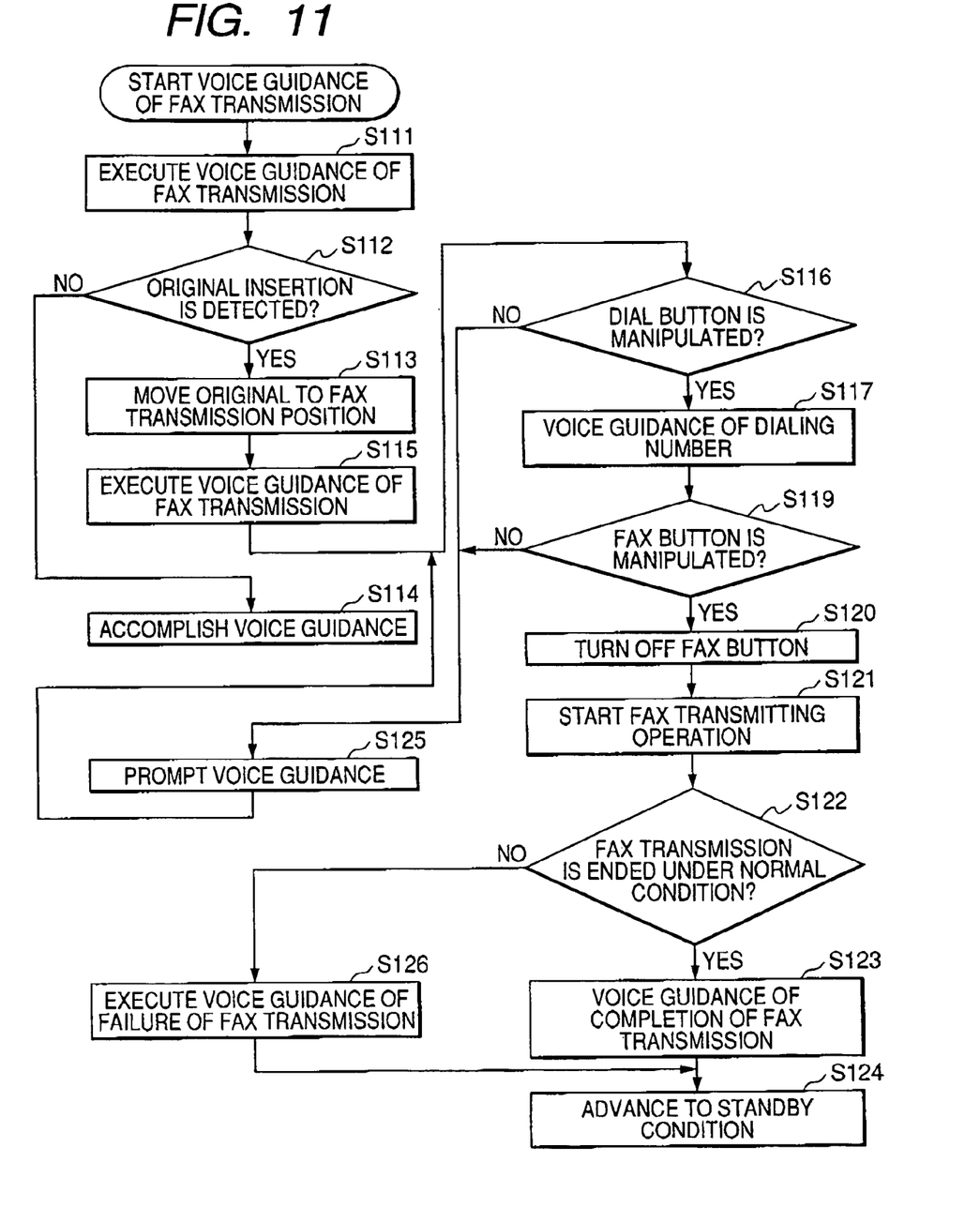
FIG. 11 is a flow chart for describing flow operations of a facsimile transmitting operation executed in the facsimile apparatus.

Next, voice guidance related to a facsimile transmitting operation will now be explained. Since the facsimile button 37 is manipulated by the user, the control operation is advanced to a first step for reading out an original, and then, the control unit 23 commences such a voice guidance message "please insert original until "peep" sound is produced while original plane to be FAX-transmitted is turned downwardly", and at the same time, flickers the guide LED 41 (step S111). The user inserts the original 50 into the original inserting hole 43 arranged in the vicinity of the guide LED 41. FIG. 9 indicates such a condition that the original 50 has been inserted. In a step S112, in such a case that the original insertion detecting unit 25 detects such a fact that the user sets the original 50 to a preselected position of the facsimile apparatus within a predetermined time after turning ON of this facsimile button 37 has been commenced, this control unit 23 automatically pulls the original 50 to the normal position (step S113). It should be noted that in the case that the above-explained original inserting operation cannot be detected within a predetermined time in the step S112, it is regarded as an error operation, and thus, the voice guidance for this facsimile transmissions is ended (step S114).

When the original 50 is pulled up to the normal position, as next voice guidance for prompting an input of a telephone number of a communication counter party, such a voice message "please enter telephone number of communication counter party, and finally, depress FAX button" is outputted (step S115). At the same time, the LED built in the dial button 35 is flickered.

When such a detection is made that the dial button 35 is manipulated by the user within a predetermined time after the flickering operation of this dial button 35 is commenced (step S116), the control unit 23 switches the flickering operation of this dial button 35 to a continuous turning-ON operation thereof and furthermore, starts to flicker the facsimile button 37. Also, the control unit 23 reads the dial button 35 manipulated by the user as voice (step S117). Either in the case that the dial button 35 is not manipulated for a predetermined time or the facsimile button 37 is not manipulated for a predetermined time, the control unit 23 again produces such a voice guidance for prompting the above-explained input operation (step S125).

In this case, if the user depresses the facsimile button 37 under flickering condition, then the control unit 23 turns OFF the facsimile button 37 and outputs such a voice guidance message "original will be FAX-transmitted" (step S120). Thereafter, the facsimile transmitting operation is commenced (step S121). In other words, the facsimile apparatus automatically dials the entered telephone number, and then, transmits facsimile data to a facsimile apparatus of a communication counter party in accordance with a predetermined procedure.

In a step S12, in the case that the facsimile transmission is accomplished under normal condition, such a voice guidance message "original has been FAX-transmitted" is outputted (step S123). On the other hand, in the step S122, in such a case that the facsimile transmission is brought into an error status due to some reason, such a voice guidance message "original could not be FAX-transmitted" is outputted, and the facsimile button 37 is again flickered for a predetermined time (step S126).

While the original 50 has already been inserted at a time when the facsimile button 37 is manipulated, if the original insertion detecting unit 25 detects the original 50, then the facsimile transmitting operation bypasses the steps for reading the original 50 (namely, steps S111, S112, S113), and immediately is advanced to the step S115 in which the control unit 23 outputs the voice guidance message for prompting the user to enter the telephone number of the communication counter party.

Figure 12:
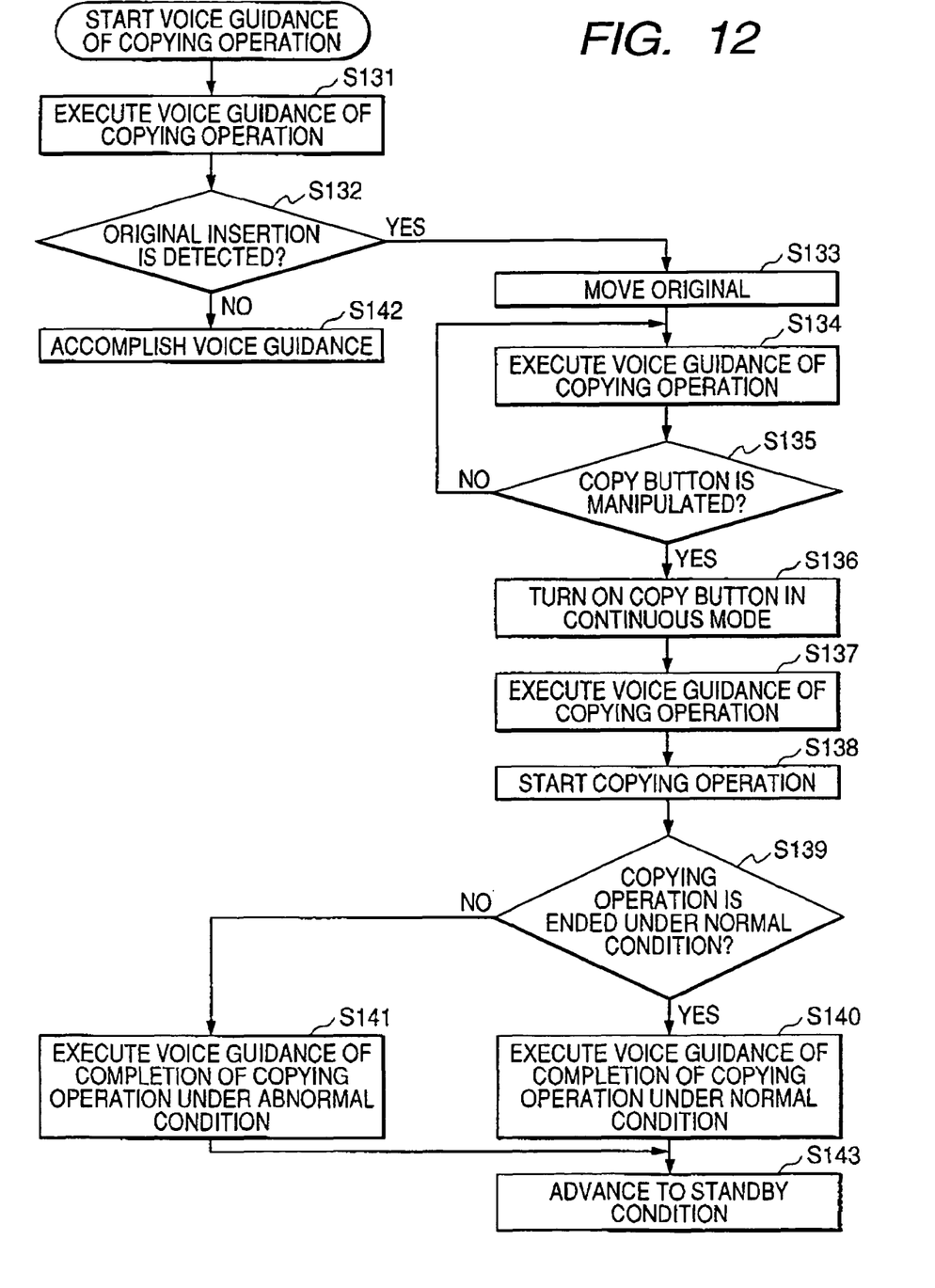
FIG. 12 is a flow chart for indicating flow operations of a copying operation executed in the facsimile apparatus.

Subsequently, voice guidance related to a copying operation will now be described. Since the copy button 36 is manipulated by the user, the control operation is advanced to a first step for reading out an original, and then, the control unit 23 commences such a voice guidance message "please insert original until "peep" sound is produced while original plane to be copied is turned downwardly", and at the same time, flickers the guide LED 41 (step S131).

In a step S132, in such a case that the original insertion detecting unit 25 detects such a fact that the user sets the original to a preselected position of the facsimile apparatus within a predetermined time after turning ON of this copy button 36 has been commenced, this control unit 23 automatically pulls the original to the normal position (step S133).

When the original is pulled up to the normal position, the control unit 23 outputs such a voice guidance message "please depress copy button" as voice guidance for prompting the next manipulation, and at the same time, flickers the copy button 136 (step S134).

When such a detection is made that the copy button 36 is manipulated by the user within a predetermined time (step S135), the control unit 23 switches the flickering operation of this copy button 36 to a continuous turning-ON operation thereof (step S136), and outputs such a voice guidance message "copying operation will be commenced" (step S137). Thereafter, the copying operation is commenced (step S138).

In a step S139, in such a case that the copying operation is accomplished under normal condition, such a voice guidance message "copying operation is ended" is outputted (step S140). On the other hand, in the case that an error happens to occur in the copying operation due to some reason, the control unit 23 outputs such a voice guidance message "copying operation could be carried out under normal operation" (step S141), and then, the facsimile apparatus is advanced to a standby condition. It should also be understood that in such a case that the insertion of the original cannot be detected within the predetermined time in the step S132, the control unit 23 regards this condition as an error operation, and thus, accomplishes the voice guidance (step S142).

This application is based upon and claims the benefit of priorities of Japanese Patent Application No. 2004-294807 filed on Oct. 7, 2004 and No. 2005-052833 filed on Feb. 28, 2005, the contents of which are incorporated herein by reference in its entirety.

The present invention is not limited only to the facsimile apparatus, but may be applied to electronic apparatus having a plurality of operation buttons on an operation panel, and thus, is capable of improving operability by a user.

What is claimed is:

1. An electronic apparatus, comprising:
a memory for storing voice data of operation explanations related to functions of the electronic apparatus;
a speaker for outputting an operation explanatory voice based upon the voice data stored in the memory;
a plurality of push-buttons for instructing an execution of the functions with respect to the electronic apparatus; and
a controller for turning ON, or flickering a push-button among the plurality of push-buttons when the operation explanatory voice related to a function of the push-button is being outputted from the speaker, wherein
the plurality of push-buttons include a first set of exposed push-buttons, and a second set of push-buttons having a cover, and wherein
voice operation explanations related to the first set of exposed push-buttons are always activated, and voice operation explanations related to the second set of push-buttons are only activated when the cover of the second-set of push-buttons is opened.

2. The electronic apparatus according to claim 1, wherein the functions include at least a telephone communication function, wherein the first set of exposed push-buttons is related to the telephone communication function, and the second set of push-buttons is related to a function other than the telephone communication function.

3. The electronic apparatus according to claim 2, wherein the function other than the telephone communication function comprises one of a facsimile transmission function and a copy function.

4. A facsimile apparatus, comprising:
a memory for storing voice data as to operation explanations related to functions of the facsimile apparatus;
an operation explanation outputter for reading out the voice data from the memory so as to output an operation explanation by way of a voice;
a plurality of push-buttons for instructing the facsimile apparatus to execute respective functions; and
an operation controller operated in such a manner that when the operation explanation by the voice is being outputted from the facsimile apparatus, the operation controller turns ON, or flickers a push-button among the plurality of push-buttons, which is related to the operation explanation by the voice being outputted by the operation explanation outputter, wherein
the plurality of push-buttons includes a first set of exposed push-buttons, and a second set of push-buttons having a cover, and wherein
voice operation explanations related to the first set of exposed push-buttons are always activated, and voice operation explanations related to the second set of push-buttons are only activated when the cover of the second-set of push-buttons is opened.

5. The facsimile apparatus according to claim 4, wherein the facsimile apparatus is further comprised of: a reader for reading an original; a facsimile transmitter for FAX-transmitting the original read by the reader; a printer for printing the original read by the reader; and a facsimile controller for controlling the reader, the facsimile transmitter, and the printer;
the plurality of push-buttons include: at least a facsimile button for instructing the facsimile apparatus to execute a FAX-transmission of the original; a dial button for entering a telephone number of a FAX communication counter party to the facsimile apparatus; and a copy button for instructing the facsimile apparatus to execute a copying operation of the original;
the facsimile controller controls the reader to read the original in response to the input of the facsimile button, controls the facsimile transmitter to FAX-transmit the original read by the reader, controls the reader to read the original in response to the input of the copy button, and controls the printer to print the original read by the reader.

6. The facsimile apparatus according to claim 5, wherein the memory stores voice data of a first operation explanation for prompting a user of the facsimile apparatus to instruct an execution of any one of a facsimile transmission function and a copy function, voice data of a second operation explanation related to the facsimile transmission function, and voice data of a third operation explanation related to the copy function.

7. The facsimile apparatus according to claim 6, wherein the operation controller controls the operation explanation outputter to output the first operation explanation, and to turn ON both the facsimile button and the copy button.

8. The facsimile apparatus according to claim 7, wherein when the facsimile button is operated while the first operation explanation is outputted, the operation controller interrupts outputting of the first operation explanation, and turns ON of both the facsimile button and the copy button, and thereafter, the operation controller controls the operation explanation outputter to output the second operation explanation.

9. The facsimile apparatus according to claim 8, wherein when the copy button is operated while the first operation explanation is outputted, the operation controller interrupts outputting of the first operation explanation, and turns ON of both the facsimile button and the copy button, and thereafter the operation controller controls the operation explanation outputter to output the third operation explanation.

10. The facsimile apparatus according to claim 4, wherein the functions include at least a telephone communication function and a facsimile transmission function, wherein the first set of exposed push-buttons is related to the telephone communication function, and the second set of push-buttons is related to the facsimile transmission function.

* * * * *